United States Patent
Rösner

[11] 3,895,916
[45] July 22, 1975

[54] COMPOSTING INSTALLATION

[75] Inventor: Kurt Rösner, Munster, Germany

[73] Assignee: Hazemag Dr. E. Andreas KG, Munster, Germany

[22] Filed: May 31, 1973

[21] Appl. No.: 365,763

[30] Foreign Application Priority Data
June 2, 1972  Germany............................ 2226729

[52] U.S. Cl. ........................... 23/259.1; 52/2; 71/9
[51] Int. Cl.²... C05F 9/00; C05F 9/02; E04B 1/345
[58] Field of Search ................. 23/259.1; 52/2; 71/9

[56] References Cited
UNITED STATES PATENTS

| | | | |
|---|---|---|---|
| 1,597,724 | 8/1926 | Cooke........................... | 23/259.1 X |
| 1,832,179 | 11/1931 | Boggiano-Pico............... | 23/259.1 X |
| 2,660,809 | 12/1953 | Morrison ....................... | 23/259.1 X |
| 3,769,763 | 11/1973 | Kwake ............................ | 52/2 |

*Primary Examiner*—Morris O. Wolk
*Assistant Examiner*—Roger F. Phillips
*Attorney, Agent, or Firm*—Michael S. Striker

[57] ABSTRACT

Platforms for material to be composted are covered by an inflatable bubble having an air lock for ingress and egress of the material and of the operating personnel. Conduits are provided for introducing air under pressure into the bubble to maintain the same inflated, and to pass through the composting material so as to enhance the composting process, and other conduits are provided into which the air can pass to be evacuated from the bubble.

14 Claims, 8 Drawing Figures

COMPOSTING INSTALLATION

BACKGROUND OF THE INVENTION

The present invention relates generally to a composting installation, and more particularly to a roofed or covered composting installation, especially for the composting of domestic and municipal refuse.

Composting installations are of course well known. It is also known to provide roofed or covered composting installations, where the purpose of the cover is primarily to prevent uncontrolled influencing of the composting process --which depends, besides the supply of a sufficient amount of oxygen, in particular upon temperature and moisture-- by ambient influences, such as the weather. For this reason it is known to provide a relatively small composting installation with a permanent and almost completely closed housing in form of a small building. However, such building constructions are of course expensive and where large-scale composting installations are involved, such as in the composting of municipal refuse, they are prohibitively expensive.

SUMMARY OF THE INVENTION

It is a general object of the present invention to provide an improved composting installation.

More particularly it is an object of the present invention to provide an improved roofed or covered composting installation which avoids the disadvantages of the prior art.

Still more specifically the invention aims to provide a covered composting installation which can be produced to large scale so that it is capable of accomodating within its outer covering a large-scale composting operation, such as the composting of municipal refuse.

An additional object of the invention is to provide such a covered composting installation wherein the cover structure is simple and inexpensive and wherein the interior of the structure is readily and inexpensively closed off from ambient influences.

Another object of the invention is to provide such a composting installation which permits a constant climate control in its interior.

A further object of the invention is to provide such an installation which requires no specific apparatus or equipment for producing the pressurized air which maintains the cover of the composting installation in inflated condition, because the air used is that which would in any case be required for supplying oxygen to the material to be composted in an amount sufficient for producing and maintaining the composting process.

In keeping with these objects, and others which will become apparent hereafter, one feature of the invention resides in a composting installation which, briefly stated, comprises support means for material to be composted, and an inflatable bubble covering the support means and having an air lock for ingress and egress of the material and of the operating personnel. Supply means is provided for continuously supplying pressurized air into the interior of the bubble for maintaining the same inflated by interior overpressure, and in such a path as to pass through the material on the support means so as to enhance the composting process.

Not only does this construction meet the objects outlined above, but it has further advantages over the prior art. In particular, and especially as compared to composting installations which are not covered, the installation according to the present invention makes possible a composting of all municipal refuse, including sewage sludge, in a completely closed environment so that surrounding areas are not subjected to unpleasant odors or other side effects of the composting operation. This makes it possible for the installation according to the present invention to be operated even in the direct vicinicity of human habitations. Undesirable odors can be readily eliminated, and the blowing-out of paper, plastic and the like by the wind, as is frequently the case in open-air composting installations, is completely avoided. Morever, an installation according to the present invention is capable of providing for the composting of the refuse of even a larger municipality under optimum conditions, because the present state of the art already provides for inflatable bubble covers having a length in excess of 100 meters and a width of approximately 40 meters so that adequate space is available in the interior for the purposes of the invention.

The composting operation itself can be carried out in any known manner, and the pressurized air which is circulated through the material to be composted in order to supply a sufficient amount of oxygen to the latter can be either circulated from beneath the material through it in upward direction, or from above through the material is downward direction. If the first possibility is used, then conduits are provided which are located beneath the support means for the composting material, having outlets through which the pressurized air --which may be climate controlled-- flows from beneath upwardly and through the composting material whereupon it enters into the free space of the bubble which it maintains in inflated conditions because the pressure is so selected that the pressure of the air exiting from the composted material is still sufficient to support the bubble material. The excess pressure existing in the bubble and maintaining the same inflated is determined in known manner by a pressure regulating valve or overpressure valve which is provided in the wall of the bubble and through which air in excess of the air required to maintain the bubble erected, can vent to the exterior, to the extent that it does not vent through possible points of leakage or through the air locks provided for ingress and egress.

If, on the other hand, it is desired that the air which is necessary for the composting process, is to pass through the composting material from above in downward direction, then the air --which may be climate controlled-- is admitted in pressurized condition into the free space within the bubble. The controlling of its temperature and/or humidity can of course also be carried out after the air has entered the bubble rather than exteriorly thereof. In this case the installation is provided with conduits which are again located beneath the support means for the composting material and which have openings through which the air --after first passing through the composting material-- can enter to be vented by these conduits to the exterior. The conduits may be provided in form of upwardly open channels which are covered with apertured plates. It will be appreciated that in this case, as in the preceding one, no special equipment is needed for maintaining the bubble erected because the same air which is required in any case to be supplied to the material for enhancing the composting process, is used for maintaining the bubble in inflated condition. The second possibility has an advantage over the first-mentioned one, namely that there will always be fresh incoming air present in the free space of the bubble so that workers in the bubble will not be annoyed by unpleasant ordors originating from the composting material. However, it is necessary in this case that the pressure in the bubble be somewhat higher than in the first-mentioned case.

Under certain circumstances, that is if the heaps of material are very densely packed as occurs towards the end of the composting process, it might be necessary to produce a higher pressure in the bubble than the material of the bubble can inherently withstand. This is because it is necessary to force the air through the dense composting material. According to the present invention this problem is overcome by connecting the conduits, which carry off the air from beneath the heaps of material, with an exhaustor so that instead of producing a higher interior pressure in the bubble to overcome the flow resistance offered to the air by the dense composting material, the suction of the exhauster helps to pull the air through the material. In this case it is possbile to use conduits of relatively small cross section rather than the widercross section channels mentioned above. Under some circumstances, particularly in the winter if it is desired to prevent excessive cooling of the rotting composting material, it may be advantageous to recirculate a part of the withdrawn air back into the ubbble in order to maintain the temperature therein at an optimum level, since this air is of course at a higher temperature than fresh air taken from the exterior.

It is also possible to use both approaches simultaneously, for instance by blowing pressurized air from below upwardly and through the composting material at a time at which the latter has already been substantially composted and is relatively dense, whereas at the beginning of the composting operation, --when the material is still relatively loose-- the air can flow through the material from above in downward direction. In fact, there will usually be heaps of material present in the bubble which will be at different stages of composting, so that the air which has been blown through the denser heaps from below can subsequently be used to flow from above through the looser heaps. The supply of air can be so controlled that the air still have sufficient pressure --after passing from below through the denser heaps of material-- to maintain the bubble inflated and on the other hand to flow through the looser heaps of composting material in downward direction. In this case, also, an exhaustor can be used which is connected with the venting conduits in order to facilitate the air flow. This combined approach has the advantage that the air in the bubble will be relatively good --in terms of breathing by human beings-- because in the heaps of compost nearing the end of the composting cycle there will be hardly any odoriferous gas liberated. It is advantageous in this particular operation if beneath the support means for the heaps of material there are conduits which permit the expulsion of pressurized air as well as others which permit the drawing-in and venting of air, and that these conduits can be operated selectively as desired. If an exhaustor is used it is also possible to selectively use these conduits either for the supply of air of for the withdrawal of air. It is advantageous if the system of conduits is subdivided into various sections which can be selectively connected to the source of pressurized air or to the exhaustor.

It is interesting to keep in mind that the possibility of operating the composting installation under interior overpressure exists only with an arrangement according to the present invention, but not with the rigid-walled type of cover because these cannot be made sufficiently airtight --without involving unacceptably high expenses-- to permit such operation.

Sprayers or other devices may be installed in the interior of the bubble to produce the desired degree of humidity.

If the support means for the heaps of composting material, that is platforms or the like, are not completely covered, because some of the completely composted material has been just removed from the bubble or new material to be composted has not been received, or for other reasons, then the airflow in the regions in which the air does not have to overcome the flow resistance of the composting material will interfere with the normal flow pattern, so that the pressure conditions necessary to make the air flow through whatever composting material is present in the bubble are not maintained. This is avoided in accordance with the present invention by subdividing the admission and venting conduits into sections which can be individually operated, that is which can be shut off or turned on as required. Thus, before a heap of material is removed from its particular location, its associated conduit sections are shut off so that the pressure conditions in the bubble and the flow conditions of the air through the remaining heaps remain unchanged.

Filters and other devices known to those skilled in the art may be employed in the regions where air is vented from the interior of the bubble, that is at the overpressure valve, the air lock or the like, which remove unpleasant odors from the vented air to avoid the existence of such odors exteriorly of the bubble.

Such bubbles are provided with air locks through which in the case of the present invention the material to be composted, and the already composted material, can be moved into and out of the bubble, respectively. Of course, these air locks also serve for the admission of operating personnel. These air locks can be so constructed that material can be moved into and out of the bubble by means of conveyors. However, they can also be constructed so that they permit trucks and similar vehicles to enter and leave. Mechanical devices may operate within the bubble for dumping and moving about the heaps of material, for instance power grabs and the like. It is particularly advantageous in this connection that the air supported bubble used in accordance with the present invention requires no supports whatsoever, so that the entire floor area covered by the bubble is unobstructed except for the heaps of material, and the mechanical devices are free to maneuver as they would in an open-air composting installation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
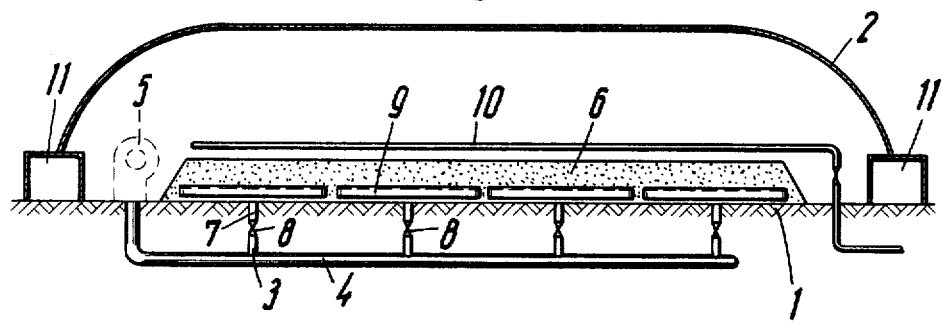
FIG. 1 is a fragmentary longitudinal vertical section through an installation according to the present invention.

Discussing firstly the embodiments in FIGS. 1-4 it will be seen that reference numeral 1 identifies a floor simply may be cemented, a paved, a bricked or dimply a dirt floor. This floor area 1 is domed-over with an air-supported bubble 2 which may in conventional manner be of plastic or rubberized fabric. Reference numeral 3 identifies air conduits provided in the floor 1 and connected via a supply conduit 4 with a blower 5 from which they receive air under pressure. In the region of the support areas or support means —for instance platforms— provided for the heaps 6 of materials to be composted the conduits 3 are provided with nozzle conduits 7 which extend upwardly and can be individually shut off by valves 8, or else turned on. Angled baffles 9 are arranged above these conduits 7 to aid in distributing the air over the length of the various heaps 6. Upwardly of the heaps 6 there are provided water spraying conduits 10 for spraying water onto the material of the heaps 6.

Reference numeral 11 identifies air locks with which the bubble 2 is provided for the admission and removal of composting material and of personnel. Reference numeral 12 identifies a venting conduit for venting air from the top of the bubble 2 and a pressure regulating valve 13 is provided in the conduit 12 which latter extends to a device 14 of known construction serving to destroy odoriferous or deleterious gases contained in the air being vented.

Figure 2:
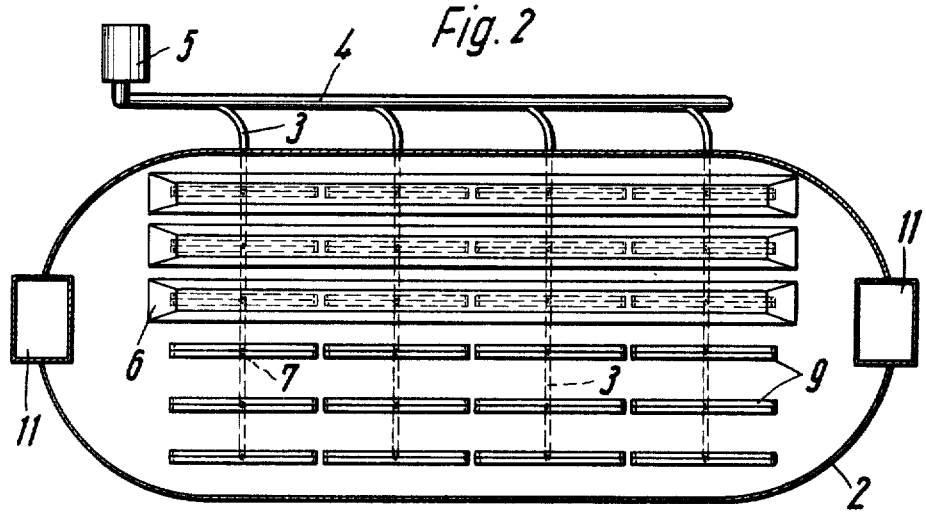
FIG. 2 is a diagrammatic top plan view illustrating the layout of the installation in FIG. 1.
Figure 3:
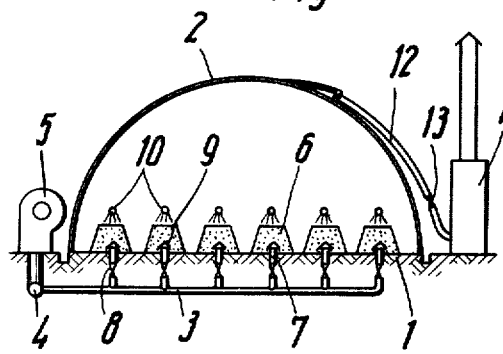
FIG. 3 is a cross-section through FIG. 1, showing the admission of pressurized air from below the heaps of material.

FIG. 2 shows the possibility that not the entire area of the supports and not all of the angled baffles 9 might be covered with the heaps of composting material at a given time. If such is the case, that is if portions of the support are exposed as shown in FIG. 2, then the valves 8 of these conduits associated with the uncovered portions of the support are closed so that the flow of air through the heaps which are in existence will not be disadvantageously influenced.

Figure 4:
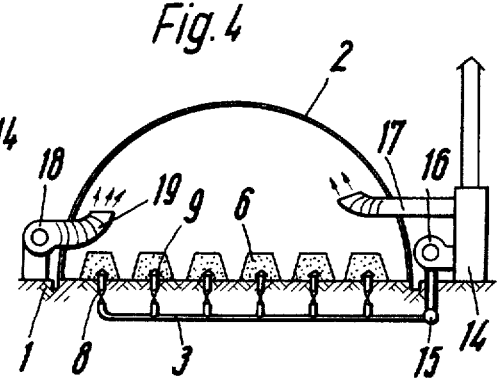
FIG. 4 is a cross-section similar to FIG. 3 but illustrating the admission of pressurized air from above the heaps of material.
Figure 5:
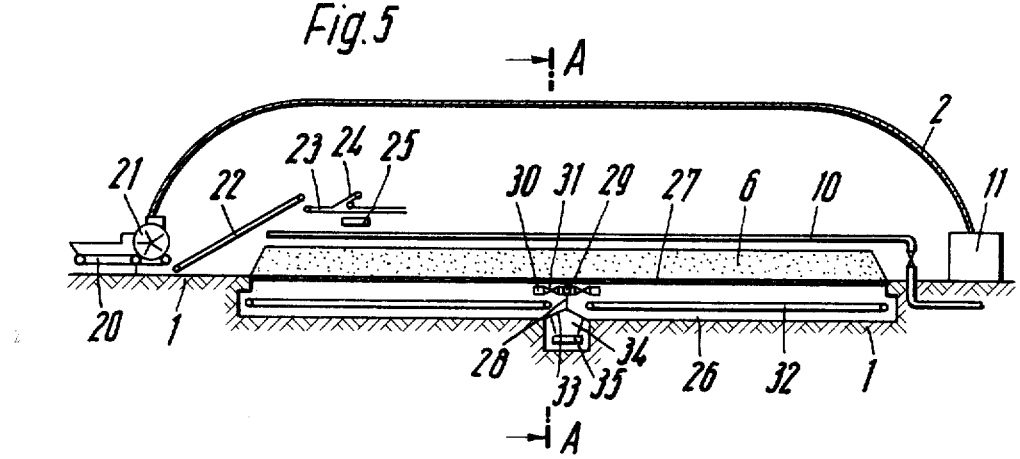
FIG. 5 is a view similar to FIG. 1 but illustrating a further embodiment of the invention.
Figure 6:
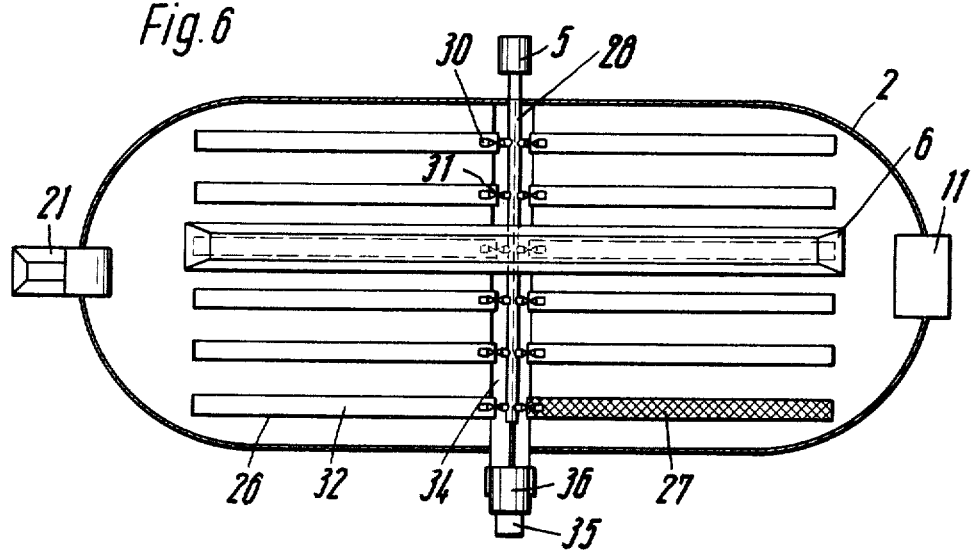
FIG. 6 is a view of FIG. 5, analogous to the view shown in FIG. 2.
Figure 7:
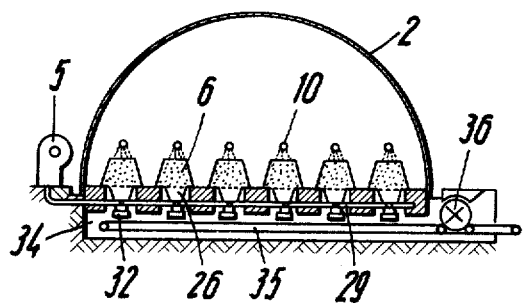
FIG. 7 is a section taken on line A—A of FIG. 5.
Figure 8:
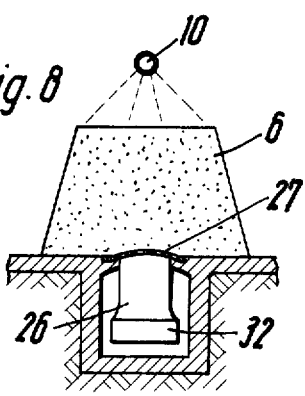
FIG. 8 is a fragmentary cross-section of the embodiment in FIG. 5, illustrating a detail in an enlarged scale.

It is clear from FIG. 4 that the conduits 3 may also be utilized to vent air which is made to pass through the heaps 6 from above. For this purpose the conduits 3 are connected with a conduit 15 which communicates with the suction side of an exhaustor 16, the latter drawing air and gases from the interior of the bubble 2 through the heaps 6 and passing them on to the device 14 which has been mentioned above. Some of the vented air can be recirculated from the device 14 via the conduit 17 back into the bubble 2, for the reasons which have been outlined above. Primary air is admitted exteriorly via a blower 18 and a flexible conduit 19 directly into the bubble 2. Since the skin of the bubble prevents the escape of this air, the air will penetrate from above into the heaps 6 of composting material so that the air circulates from the exterior into the interior of the heaps 6 to be withdrawn into the conduits 3.

Coming to the embodiment illustrated in FIGS. 5-8 it will be seen that like reference numerals here identify like components as in the preceding embodiment. One difference of the embodiment in FIGS. 5-8 over the preceding embodiment is the increased degree of mechanization. Reference numeral 20 thus for instance identifies a conveyor belt which permits the introduction of material to be composted and which cooperates with a rotary distributor 21 of the cell-wheel type, by means of which the incoming material is evenly distributed upon a further conveyor 22 within the bubble 2. The conveyor 22 transfers the material to a conveyor 23 from where strippers 24 or other devices discharge the material onto a transversely extending conveyor 25 which is located below the conveyor 23 and is longitudinally and transversely displaceable, so that the material can be stacked in elongated heaps 6.

In the floor 1 there are provided channels 26 which are upwardly open and covered by apertured plates 27. These channels 26 are subdivided at their middle by a divider wall 28, dividing them into two sections. Of course, more than two sections could be created in this manner. An air conduit 29 is located in the region of the divider wall 28 and outlets 30 extend into each of these sections. Each outlet can be closed by a valve 31. The conduit 29 is connected with the blower 5, and can be selectively connected with the pressure side or the suction side thereof, so that air can be made to flow through the heaps 6 from below in upward direction, or can be driven through them from above in downward direction. In the latter case the blower 5 will also pass a part of the air into the bubble 2 in order to supply additional air for supporting the bubble, that is maintaining it inflated, as described in FIGS. 1-4 with reference to the components 14 and 17. The primary air, that is fresh air from the exterior, is there introduced into the bubble 2 directly.

Of course, it is possible to provide two air supply systems of the type just outlined, of which one is permanently connected to an exhauster and the other permanently connected to a blower. In such a case it is possible to produce section or pressure in the individual sections created by the provision of the divider wall 28, or to completely shut off both suction and pressure, depending upon whether air is to be circulated from above in downward direction or from below in upward direction through the heaps 6, or whether in the absence of the heaps 6 no air is to be circulated at all.

Conveyors 32 are located at the bottom region of the channels 26 and advance composted material in direction towards the divider wall 28 next to which at opposite sides there is provided a discharge trap 33 for each channel section. These traps normally close openings communication with a discharge channel 34 which extends transversely of the channels 26 and into which the conveyors 32 discharge composted material when the traps 33 are open, to fall onto a conveyor 35 arranged at the bottom of the channel 34. The conveyor 35 supplies the material to a rotary distributor 36 similar to the one identified with reference numeral 21, via which the material is the discharged.

When a heap or a portion of a heap 6 which is completely composted is to be removed, the valve 31 associated with the respective conduit section is closed and the associated trap 33 is opened. One or more of the plates 27 are removed and the composted material is then thrown through this opening —either manually or by an appropriate mechanical device— onto the belt 32 which supplies it to the belt 35 and from where it passes via the distributor 36 to the exterior. The conduits 10 and the air lock 11 in this embodiment correspond to those described in the preceding embodiment.

It will be understood that each of the elements described above, or two or more together, may also find a useful application in other types of constructions differing from the types described above.

While the invention has been illustrated and described as embodied in a composting installation, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims. cm
What is claimed as new and desired to be protected by Letters Patent is set forth in the appended claims:

1. In a composting installation, a combination comprising support means for material to be composted; an inflatable bubble covering said support means and having an air lock for ingress and egress of the material; supply means for continuously supplying pressurized air into the interior of said bubble; vent means communicating said interior of said bubble with the exterior thereof; means for controlling at least one of said supply means and vent means so as to establish a controlled air flow and an overpressure in said interior for maintaining said bubble inflated; and means for directing said pressurized air through said composting material and said support means so as to enhance the composting process in said composting material.

2. A combination as defined in claim 1, wherein said support means comprises conduit means which discharges said pressurized air into said bubble above said platform means and the material thereon; and wherein said vent means comprises venting conduit means beneath said platform means and having inlets which are so located that said pressurized air passes from said bubble through the material and into said venting conduit means.

3. A combination as defined in claim 1, wherein said support means comprises platform means, and said supply means comprises a blower; further comprising an exhaustor; and apertured conduit means extending beneath said platform means and communicating with said interior of said bubble and being selectively connectable with said blower and said exhaustor.

4. A combination as defined in claim 1, wherein said support means comprises platform means; and further comprising selectively operable apertured conduits for pressurized air and for suction air, extending beneath said platform means and communicating with said interior of said bubble.

5. A combination as defined in claim 1, wherein said support means comprises platform means; and wherein said supply means comprises conduits extending beneath said platform means and having outlets for said pressurized air which are so oriented that the air passes from below through said material.

6. A combination as defined in claim 2; and further comprising suction means communicating with said venting conduit means.

7. A combination as defined in claim 6, said suction means including an exhaustor having a pressure side; and further comprising a return conduit communicating with said pressure side and operative for returning a portion of the air from said pressure side into said bubble.

8. A combination as defined in claim 2, wherein said venting conduit means comprises channels being upwardly open beneath said platform means, and apertures in the latter.

9. A combination as defined in claim 4, wherein said conduits are subdivided into sections which are selectively and individually operable.

10. A combination as defined in claim 1; and further comprising means for removing decomposition gases from the pressurized air which has passed through the material on said support means.

11. A combination as defined in claim 1; and further comprising climate-control means for pressurized air being admitted into said bubble.

12. A combination as defined in claim 1; and further comprising wetting means above said support means for wetting the material on the latter.

13. A combination as defined in claim 1; and further comprising conveyor means for conveying material through said air lock between the exterior and the interior of said bubble.

14. In an installation for coposting materials, in combination comprising means for separating an enclosed space from the ambient atmosphere, said separating means including base means for supporting the material to be composted, bubble means connected to said base means and extending above the same, and admission means for affording access to said enclose space; means for continuously supplying pressurized air from the ambient atmosphere into said enclosed space through said separating means; means for discharging the pressurized air from said enclosed space into the ambient atmosphere through said separating means; means for controlling the rate of air flow through at least one of said supplying and discharging means so as to maintain said bubble inflated; and means for passing said pressurized air at least once through said composting material on said base means on its way from said supplying to said discharging means so as to enhance the composting process in said composting material.

* * * * *